US007578222B2

(12) United States Patent
Liebheit

(10) Patent No.: US 7,578,222 B2
(45) Date of Patent: Aug. 25, 2009

(54) ROTARY CUTTER

(75) Inventor: Stefan Liebheit, Staufen (CH)

(73) Assignee: Mueller Martini Holding AG, Hergiswil (CH)

(*) Notice: Subject to any disclaimer, the term of this patent is extended or adjusted under 35 U.S.C. 154(b) by 126 days.

(21) Appl. No.: 11/225,127

(22) Filed: Sep. 14, 2005

(65) Prior Publication Data

US 2006/0065091 A1 Mar. 30, 2006

(30) Foreign Application Priority Data

Sep. 20, 2004 (EP) .................................. 04405600

(51) Int. Cl.
*B23D 19/04* (2006.01)
*B26D 5/20* (2006.01)

(52) U.S. Cl. ......................... 83/425.4; 83/76.7; 83/499; 83/500; 83/503

(58) Field of Classification Search ..................... 83/76, 83/499, 500, 501, 502, 503, 425.4, 76.7, 83/76.6, 76.1, 508.1, 508.2, 508.3; 33/613, 33/626, 628
See application file for complete search history.

(56) References Cited

U.S. PATENT DOCUMENTS

| | | | | | |
|---|---|---|---|---|---|
| 3,786,705 | A | * | 1/1974 | Dorfel | 83/76.7 |
| 4,592,259 | A | * | 6/1986 | Gorner et al. | 83/13 |
| 4,962,684 | A | * | 10/1990 | Mowry | 83/332 |
| 4,989,486 | A | * | 2/1991 | Miller et al. | 83/499 |
| 5,979,282 | A | | 11/1999 | Schlatter | |
| 6,009,784 | A | * | 1/2000 | Pizzi et al. | 83/428 |
| 6,161,458 | A | * | 12/2000 | Spatafora | 83/13 |
| 6,481,650 | B1 | * | 11/2002 | Mori | 241/24.15 |
| 7,086,173 | B1 | * | 8/2006 | Alatalo et al. | 33/640 |
| 2008/0229599 | A1 | * | 9/2008 | Auth et al. | 33/628 |

FOREIGN PATENT DOCUMENTS

| | | | |
|---|---|---|---|
| EP | 1 177 833 | A1 | 2/2002 |
| EP | 1 510 288 | A1 | 3/2005 |

* cited by examiner

*Primary Examiner*—Boyer D. Ashley
*Assistant Examiner*—Laura M. Lee
(74) *Attorney, Agent, or Firm*—Venable LLP; Robert Kinberg; Justine A. Gozzi

(57) ABSTRACT

A rotary cutter comprises a first knife located on a knife shaft having a longitudinal axis, a second knife spaced from the first knife by an adjustable cutting gap, a control unit including a drive for turning at least one of the first knife or the second knife, and an adjusting mechanism for moving at least one of the first knife or the second knife in the direction of the longitudinal axis to adjust the cutting gap. The adjusting mechanism comprises a first signal transmitter for detecting a zero position of the first and second knives; a second signal transmitter for detecting the cutting position of the first and second knives; and an adjustment drive coupled to the first and second signal transmitters for movement of at least one of the first or second knives from the zero position to the cutting position.

15 Claims, 2 Drawing Sheets

ROTARY CUTTER

CROSS-REFERENCE TO RELATED APPLICATIONS

This application claims the priority of European Patent Application No. 04405600.0-2302, filed on Sep. 20, 2004, the entire content of which is hereby incorporated herein by reference.

BACKGROUND OF THE INVENTION

1. Technical Field

The present invention relates generally to rotary cutters for the print-processing industry. More specifically, the present invention relates to rotary cutters including a pair of knives separated by an adjustable cutting gap.

2. Related Art

Known rotary cutters typically include an upper knife and a lower knife, both of which are mounted on rotating shafts. The upper knife and lower knife are separated by a cutting gap that can be adjusted by an adjusting mechanism that allows one or both of the knives to be moved along the axis of its shaft. Typically, the cutting gap is adjusted manually by first moving one of the knives from a starting position to a zero position (i.e., where there is no cutting gap), and then moving the knife in the opposite direction from the zero position to the desired cutting position. A certain mechanical knowledge is necessary for making the correct adjustment. Typically, a skilled mechanic is consulted for this adjustment. A rotary cutter as described above is disclosed in European Patent Application No. 03 405 621.8, filed Aug. 28, 2003, which is owned by the applicants of the present invention, and incorporated herein by reference.

To achieve optimum cutting results with the above-described type of rotary cutter, the cutting gap between the upper knife and the lower knife must be adjusted, for example, in the range of 0.03 mm to 0.035 mm. This adjustment is commonly made by way of an adjusting spindle having vernier, wherein either the upper knife or the lower knife is adjusted. The adjustment of the cutting gap must be done with extreme precision to prevent a cutting gap that is either too wide or too narrow. For example, if the cutting gap is too wide, the cutting quality will be insufficient. If the cutting gap is too narrow, the knife blades can break, especially the upper knife blade which is usually quite expensive.

European Patent No. 1 177 833 A1 discloses a rotary cutting machine in which the upper knife blade and the lower knife blade are electrically insulated relative to one another, such that, if the two knives come into contact during the cutting operation, a circuit is closed and an optical or acoustic signal is emitted. Usually, such a contact between the knives is caused by strong heat expansion. The optical or acoustic signal is intended to trigger a shut down of the machine when the blades make contact, thus avoiding damage to the blades. However, an unintended signal may be emitted if the circuit is closed, for example, because of oil in the cutting gap. This type of rotary cutting machine also experiences the aforementioned disadvantages in adjusting the cutting gap.

Therefore, there remains a need in the art for a rotary cutter that overcomes the shortcomings of conventional solutions.

SUMMARY OF THE INVENTION

It is an object of the present invention to provide a rotary trimmer that allows safer and easier adjustment of the cutting gap.

The above and other objects are accomplished according to the invention by the provision of a rotary cutter, comprising: a first knife located on a knife shaft having a longitudinal axis; a second knife spaced from the first knife by an adjustable cutting gap; a control unit including a drive for turning at least one of the first knife or the second knife; and an adjusting mechanism for moving at least one of the first knife or the second knife in the direction of the longitudinal axis to adjust the cutting gap, the adjusting mechanism comprising: a first signal transmitter for detecting a zero position of the first and second knives; a second signal transmitter for detecting the cutting position of the first and second knives; and an adjustment drive coupled to the first and second signal transmitters for movement of at least one of the first or second knives from the zero position to the cutting position.

According to an exemplary embodiment of the invention, the zero position of the blades can be reached automatically, and the cutting gap can be adjusted from the zero position. For example, as soon as the zero position is reached, movement of the knives toward one another is stopped, and the knives are then moved by means of the adjusting drive in the opposite direction into the cutting position. Therefore, the cutting gap is essentially adjusted automatically, and error manipulations can be eliminated.

According to one embodiment of the invention, the adjustable knife can be moved by means of the adjusting drive from a starting position to the zero position, wherein the cutting gap width for the starting position is, for example, 1.0 mm. A starting gap of this type can be adjusted easily and safely without risking blade breakage.

According to another embodiment, the counter knife can be rotated by means of the knife driving mechanism during its approach to the zero position. Once the zero position is reached, the adjustable knife will rotate along with the counter knife as a result of frictional contact between the two blades. The signal transmitter can be designed to detect the rotation of the adjustable knife, for example, using a shaft encoder. Once the zero position is reached, the shaft encoder can transmit a signal to the adjusting drive which then stops immediately and subsequently moves the adjustable knife in the opposite direction for adjusting the cutting gap. Damage to the blades, in particular, can be avoided when using a shaft encoder which detects the zero position with high reliability and precision. According to an alternative embodiment, the control unit stores the zero position value and, based on this stored value, automatically moves the adjustable knife into the cutting position.

A second shaft encoder can be provided for determining the cutting gap during the movement to the cutting position.

The adjustable knife can be adjusted by way of an adjusting spindle that is located in a bushing or slide cradle. For example, the shaft of the adjustable knife can be positioned on the bushing and/or the adjusting spindle that permits extremely precise movements.

A specific gap width can be specified for the rotary cutter and adjusted automatically. Since the operation is essentially an automatic operation, it is much easier to change the cutting gap width and, consequently, to adapt the cutting-gap width to the corresponding product and/or to vary the cutting-gap width. It is also possible to store one or more predetermined cutting-gap widths in the control unit. The desired cutting-gap width can then be selected, for example, by inputting a command, and then adjusted automatically.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements, in which.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

Figure 1:
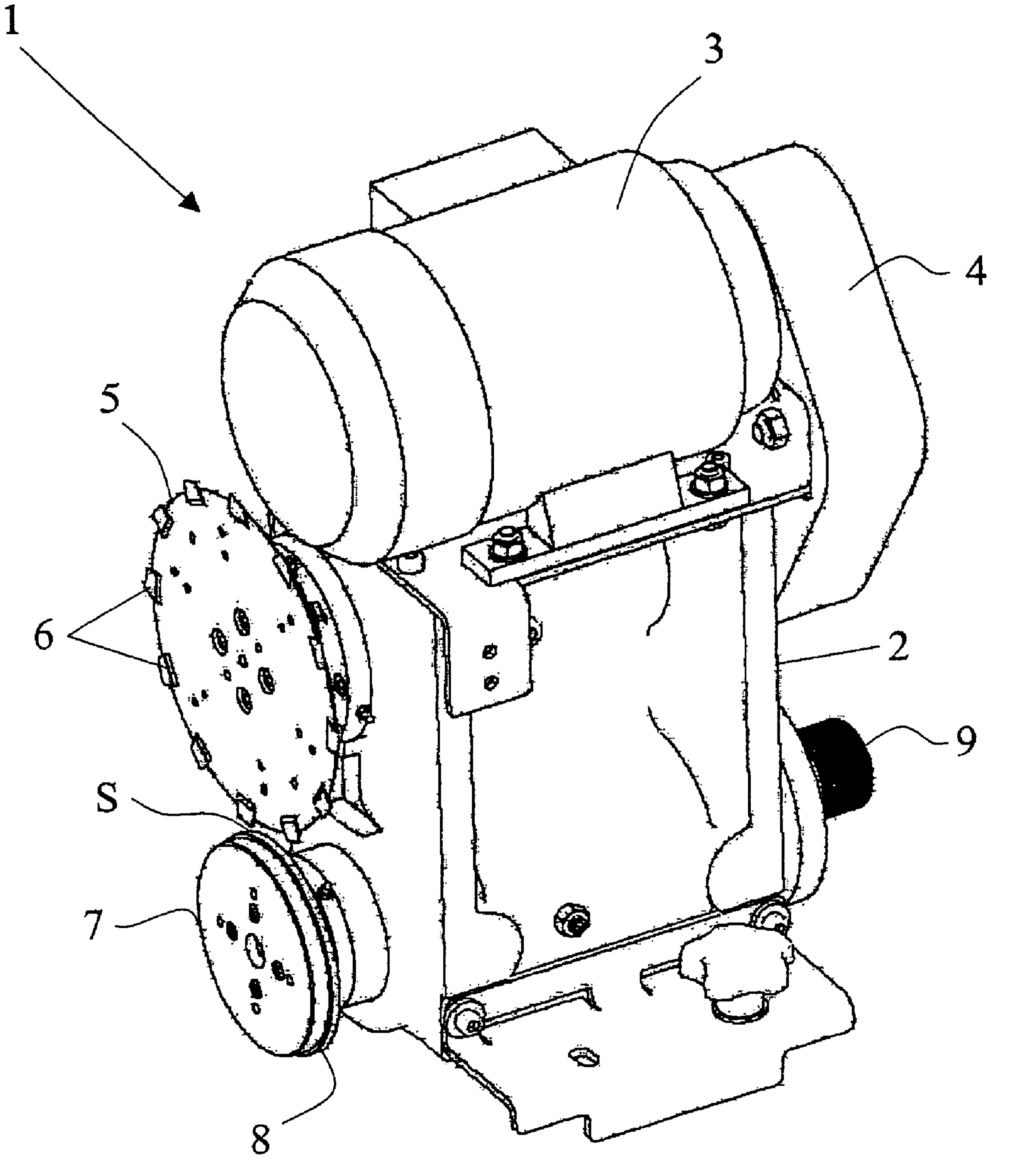
FIG. 1 is a perspective view of an exemplary rotary cutter according to the present invention.
Figure 3:
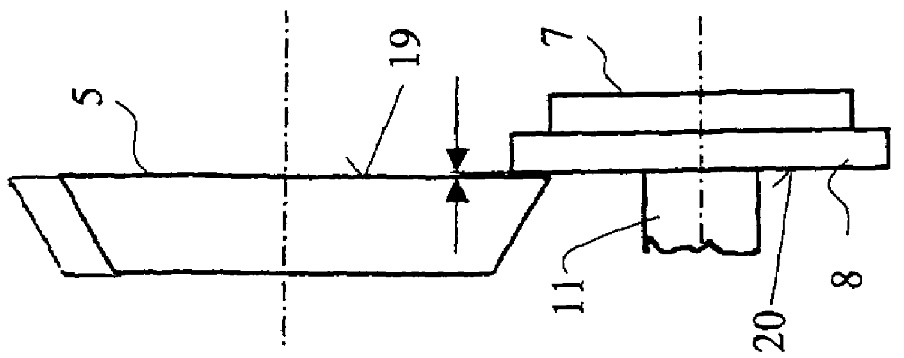
FIG. 3 is a side view of the cutting knives of the rotary cutter of FIG. 1, shown in the zero position.

Referring to FIG. 1, an exemplary embodiment of a rotary cutter according to the present invention is shown. The rotary cutter 1 comprises a frame 2 having an upper knife 5 and lower knife 7 mounted thereto. The upper knife 5 can be driven via a motor 3, which is connected to a drive unit (located underneath a cover 4 and not visible in the embodiment of FIG. 1). The drive unit can rotate a shaft (not visible in FIG. 1) that turns upper knife 5.

As shown in FIG. 1, the upper knife 5 can include a multitude of circumferentially arranged blades 6. The blades 6 can be produced from a suitable hard metal and attached to the central region of the upper knife 5. The lower knife 7 acts as a counter knife and can consist of a ring 8 of hard metal which operates jointly with the blades 6. The upper knife 5 and the lower knife 7 can rotate around parallel axes A1 and A2, as shown in FIG. 2.

Figure 2:
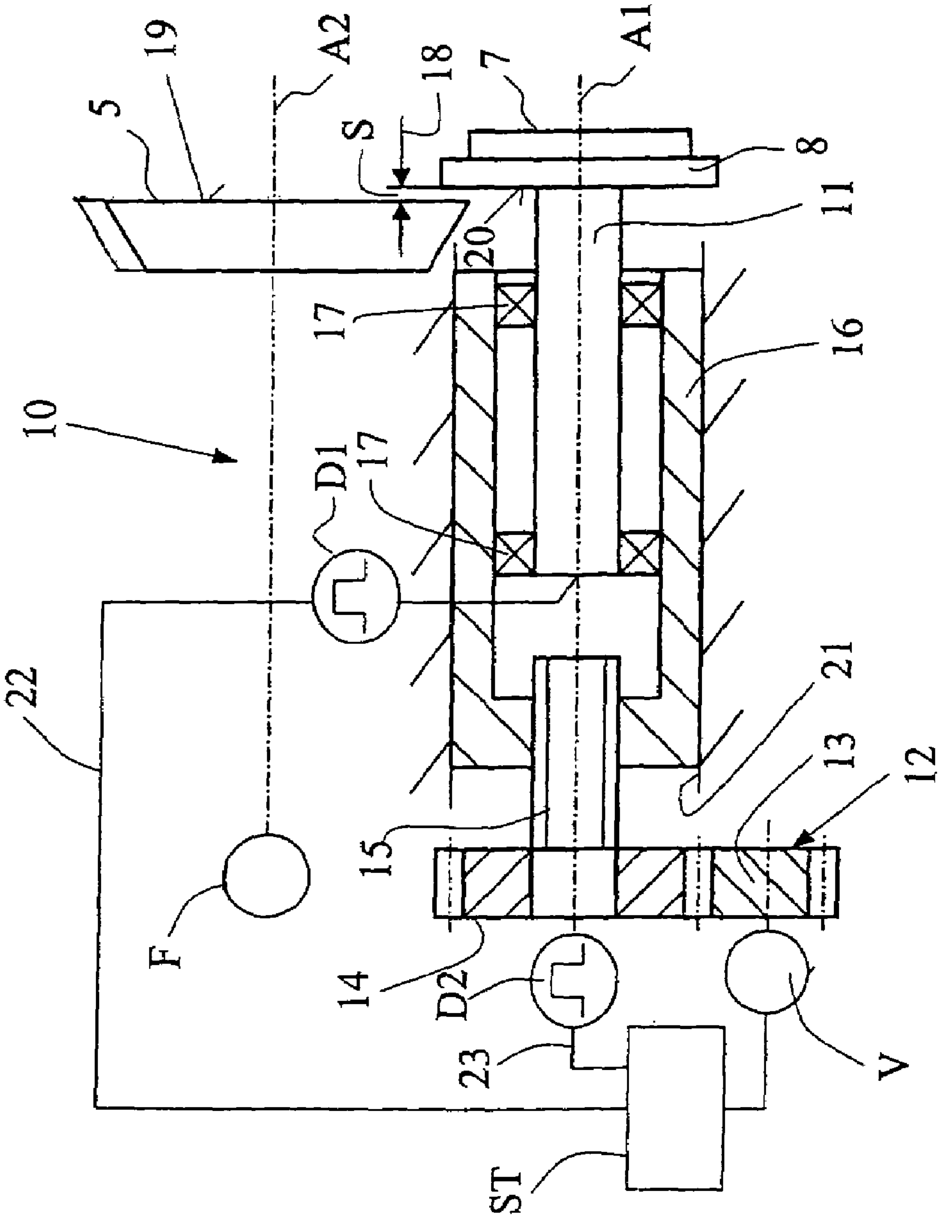
FIG. 2 is a cross-sectional view of an exemplary adjusting mechanism of the rotary cutter of FIG. 1.

Referring to FIG. 2, the lower knife 7 can include a shaft 11 that is mounted on two bearing elements 17 in a sliding member, such as a bushing 16, such that the shaft 11 can rotate. The bushing 16 can move in the longitudinal direction of the knife shaft 11 (for example, parallel to the axis A1), inside a bearing bore 21 located on the machine frame 2. The bushing 16 can be secured against rotation with respect to the frame 2.

Still referring to FIG. 2, the rotary cutter includes an adjusting mechanism 10 having an adjusting drive 12 that can displace the bushing 16. The adjusting mechanism 10 can include a servomotor V, preferably a controlled electric motor, that drives a gearwheel 13 that engages another, preferably larger, gearwheel 14. An adjusting spindle 15 acts upon the bushing 16 attached to the gearwheel 14. Depending on the rotational direction of the spindle 15, the bushing 16 in FIG. 2 is moved either to the left or to the right, resulting in corresponding movement of lower knife 7 along axis A1. The servomotor V can be controlled by a control unit ST.

The upper knife 5 can be driven by a second motor F, which can also be referred to as milling motor. During the cutting operation, the upper knife 5 is driven by the motor F, and rotation is imparted to the lower knife 7.

The rotational movement of the knife shaft 11 can be detected by a first shaft encoder D1. Once the knife shaft 11 starts its rotation, its movement is detected by the first shaft encoder D1, which transmits a corresponding signal to the control unit ST, for example, via a signal line 22. A second shaft encoder D2 is provided to measure the movement of spindle 15 in the longitudinal direction (for example, parallel to axis A1). The second shaft encoder D2 can be connected via an additional signal line 23 to the control unit ST.

The method of adjusting the cutting gap S will now be explained in detail. As shown in FIG. 2, the cutting gap S is defined by a surface 19 of the upper knife 5 and a surface 20 of the lower knife 7. The surface 19, in turn, is formed by the surfaces of blades 6 and an internal surface of the hard-metal ring 8. The cutting gap S has a width of, for example, 0.03 to 0.035 mm in the cutting position of the adjustable lower knife 7, wherein other gap widths are conceivable as well. In FIG. 2, this distance is indicated with arrows 18. For drawing reasons, the gap width shown herein is much larger than in reality.

To adjust the cutting gap S, the lower knife 7 is moved to a "starting" position where the distance between the surfaces 19 and 20 is considerably larger than the cutting gap to be adjusted, for example, a distance of 1.0 mm. This may be accomplished with the aid of the rotary knob 9, shown in FIG. 1. In principle, this distance can also be adjusted automatically.

Once the knives 5, 7 have been placed in the starting position, the adjusting operation can be triggered by way of a key (not shown herein). The control unit ST the moves the servomotor V in such a way that the lower knife 7 moves to the left while the upper knife 5 is simultaneously rotated by the motor F. The hard metal ring 8 thus approaches the upper knife 5 in F*igure* 2. As soon as the hard metal ring 8 comes into contact with the surface 19, the lower knife 7 begins to rotate as a result of the frictional contact between the hard metal ring 8 and the upper knife 5. This rotational movement of the lower knife 7 is detected by the first shaft encoder D1, which then transmits a signal via the signal line 22 to the control unit ST. The control unit ST then stops movement of the servomotor V, so that the upper knife 5 remains in the adjusted position. This position is illustrated in F*igure* 3 and represents a "zero" position from which the cutting gap S is adjusted.

As soon as the servomotor V stops, its rotational direction is reversed by the control unit ST. The bushing 16 and the lower knife 7 then move to the right (as viewed from FIG. 2) and a gap forms once more between the surfaces 19 and 20. This gap is measured by the second shaft encoder D2 and the value transmitted via the signal line 23 to the control unit ST. The second shaft encoder D2 primarily measures the rotation of spindle 15, which is proportional to the distance between the surfaces 19 and 20. To adjust the cutting gap S and/or the predetermined distance between the surfaces 19 and 20, the spindle 15 is rotated by a correspondingly specified amount which generally means a partial rotation of the spindle 15. Once this partial rotation has been completed, the second shaft encoder D2 transmits a corresponding signal via the signal line 23 to the control unit ST. The control unit ST immediately stops the servomotor V and thus all further movement of the lower knife 7. The cutting gap S is thus adjusted and the rotary cutter 1 can be used as intended, for example, for trimming brochures, magazines, and other print products.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A rotary cutter, comprising:

a first knife located on a knife shaft having a longitudinal axis;

a second knife spaced from the first knife by an adjustable cutting gap;

a control unit including a drive for turning one of the first knife or the second knife, with the other one of the first knife or the second knife separated from the one knife and remaining rotationally stationary; and an adjusting mechanism for moving at least one of the first knife or the second knife in the direction of the longitudinal axis to adjust the cutting gap, the adjusting mechanism comprising:

a first signal transmitter for detecting a zero position of the first and second knives by detecting an initial rotation from a stationary position of the other one of the first and second knife imparted by frictional contact of the first knife with the second knife;

a second signal transmitter for detecting a cutting position of the first and second knives; and an adjustment drive coupled to the first and second signal transmitters for movement of at least one of the first knife or second knife from the zero position to the cutting position.

2. The rotary cutter of claim 1, wherein the adjustment drive moves at least one of the first or second knives from a starting position to the zero position.

3. The rotary cutter of claim 1, wherein the first signal transmitter comprises a shaft encoder.

4. The rotary cutter of claim 1, wherein the adjusting mechanism stores the zero position, and the adjustment drive automatically moves at least one of the first or second knives to the cutting position based on the stored zero position.

5. The rotary cutter of claim 1, wherein the adjusting mechanism further comprises an adjusting spindle for moving at least one of the first or second knives to adjust the cutting gap, and the second signal transmitter comprises a shaft encoder that detects rotation of the adjusting spindle.

6. The rotary cutter of claim 5, further comprising a controlled servomotor for operating the adjusting spindle.

7. The rotary cutter of claim 5, further comprising a sliding member on which at least one of the first and second knives is mounted, wherein the adjusting spindle engages the sliding member.

8. The rotary cutter of claim 5, further comprising a gear reducer unit having a gearwheel connected to the adjusting spindle.

9. The rotary cutter of claim 1, wherein the first knife is a lower knife and the second knife is an upper knife, and the position of at least one of the first or second knives can be adjusted.

10. The rotary cutter of claim 1, wherein the drive actively turns the second knife, and the first transmitter automatically detects the zero position when the second knife begins to impart rotation to the first knife through frictional contact.

11. A method of operating a rotary cutter, the rotary cutter including a first knife located on a knife shaft having a longitudinal axis; a second knife spaced from the first knife by an adjustable cutting gap; an adjusting mechanism for moving at least one of the first knife or the second knife in the direction of the longitudinal axis to adjust the cutting gap, the adjusting mechanism including a first signal transmitter for detecting initial rotation of the other one of the first and second knife; a second signal transmitter for detecting a cutting position of the first and second knives; and an adjustment drive coupled to the first and second signal transmitters for movement of at least one of the first knife or second knife to the cutting position, the method comprising:

positioning the first knife and the second knife a distance away from each other one;

rotating one of the first knife or the second knife, with the other one of the first knife or second knife remaining rotationally stationary;

moving one of the first knife or the second knife, with the aid of the adjustment mechanism, in the direction of the longitudinal axis, so that the first knife and second knife approach one another;

detecting, with use of the first signal transmitter, a zero position by detecting the initial rotation of the other one of the first knife or the second knife upon frictional contact of the first knife with the second knife;

moving at least one of the first knife or the second knife, with the aid of the adjustment drive, from the zero position to the cutting position; and detecting the cutting position of the first knife and the second knife by the second signal transmitter.

12. The method of claim 11, further comprising: storing the zero position in the adjusting mechanism; and wherein the moving one of the first knife or second knife from the zero position to the cutting position is automatic.

13. The method of claim 11, wherein the moving at least one of the first knife or the second knife to the cutting position is performed by an adjusting spindle of the adjusting mechanism and the detecting the zero position is performed by a shaft encoder of the adjusting spindle.

14. The method of claim 13, wherein the rotary cutter includes a controlled servomotor, and the method further comprising operating the adjusting spindle with the controlled servomotor.

15. The method of claim 13, wherein the rotary cutter includes a sliding member, the method further comprising mounting at least one of the first or second knives on the sliding member, and engaging the adjusting spindle with the sliding member.

* * * * *

UNITED STATES PATENT AND TRADEMARK OFFICE

CERTIFICATE OF CORRECTION

PATENT NO. : 7,578,222 B2
APPLICATION NO. : 11/225127
DATED : August 25, 2009
INVENTOR(S) : Stefan Liebheit It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 254 days.

Signed and Sealed this

Seventh Day of September, 2010

David J. Kappos

*Director of the United States Patent and Trademark Office*